(12) United States Patent
Tange et al.

(10) Patent No.: US 10,583,706 B2
(45) Date of Patent: Mar. 10, 2020

(54) METHOD OF MANUFACTURING A SUSPENSION COIL SPRING

(71) Applicant: NHK SPRING CO., LTD., Yokohama-shi, Kanagawa (JP)

(72) Inventors: Akira Tange, Yokohama (JP); Hideki Okada, Yokohama (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 16/231,569

(22) Filed: Dec. 23, 2018

(65) Prior Publication Data

US 2019/0126706 A1 May 2, 2019

Related U.S. Application Data

(60) Division of application No. 14/789,779, filed on Jul. 1, 2015, now abandoned, which is a continuation of
(Continued)

(51) Int. Cl.
*B60G 11/14* (2006.01)
*B60G 11/16* (2006.01)
(Continued)

(52) U.S. Cl.
CPC .............. *B60G 11/14* (2013.01); *B60G 11/16* (2013.01); *C21D 7/06* (2013.01); *F16F 1/04* (2013.01);
(Continued)

(58) Field of Classification Search
CPC .... B60G 11/16; B60G 11/14; B60G 2500/20; B60G 2202/12; B60G 2206/42;
(Continued)

(56) References Cited

U.S. PATENT DOCUMENTS

| 4,526,628 A | 7/1985 | Ohno et al. |
| 6,022,427 A | 2/2000 | Wienand et al. |

(Continued)

FOREIGN PATENT DOCUMENTS

| CN | 102481681 A | 5/2012 |
| EP | 1201773 A1 | 5/2002 |

(Continued)

OTHER PUBLICATIONS

Chinese Office Action (and English translation thereof) dated Aug. 30, 2016, issued in counterpart Chinese Application No. 201480042636.0.

(Continued)

*Primary Examiner* — Xuan Lan Nguyen
(74) *Attorney, Agent, or Firm* — Holtz, Holtz & Volek PC (57) ABSTRACT

A method of manufacturing a suspension coil spring includes forming first shot peening indentations on a surface of a wire by projecting first shots toward the wire and forming a compressive residual stress portion to which a compressive residual stress is imparted from the surface of the wire to a first depth, and projecting ball shots as second shots toward a lower end turn portion by an ultrasonic apparatus. A size of each ball shot is larger than a size of each first shot. The method includes forming second shot peening indentations on a surface of the lower end turn portion, and a deep residual stress portion in the lower end turn portion, a compressive residual stress of the deep residual stress portion imparted from the surface of the wire to a second depth that is deeper than the first depth.

5 Claims, 11 Drawing Sheets

Related U.S. Application Data application No. PCT/JP2014/064165, filed on May 28, 2014.

(51) Int. Cl.

| | | |
|---|---|---|
| *C21D 7/06* | (2006.01) | |
| *F16F 1/04* | (2006.01) | |
| *C21D 9/02* | (2006.01) | |

(52) U.S. Cl.
CPC ...... *B60G 2202/12* (2013.01); *B60G 2206/42* (2013.01); *B60G 2206/81* (2013.01); *B60G 2206/8402* (2013.01); *B60G 2206/8403* (2013.01); *B60G 2500/20* (2013.01); *C21D 9/02* (2013.01); *F16F 2226/02* (2013.01)

(58) Field of Classification Search
CPC ........ B60G 2206/81; B60G 2206/8403; B60G 2206/8402; F16F 1/04; C21D 9/02; C21D 7/06

See application file for complete search history.

(56) References Cited

U.S. PATENT DOCUMENTS

| | | |
|---|---|---|
| 6,199,882 B1 | 3/2001 | Imaizumi et al. |
| 6,346,157 B1 | 2/2002 | Takezawa et al. |
| 6,544,360 B1 | 4/2003 | Tange et al. |
| 8,308,150 B2 | 11/2012 | Tange et al. |
| 8,533,954 B2 | 9/2013 | Tange et al. |
| 8,607,605 B2 | 12/2013 | Tange et al. |
| 9,341,223 B2 | 5/2016 | Suzuki et al. |
| 2007/0116963 A1 | 5/2007 | Sakakibara |
| 2016/0046164 A1 | 2/2016 | Yamamoto et al. |

FOREIGN PATENT DOCUMENTS

| | | | |
|---|---|---|---|
| EP | 2444203 | A1 | 4/2012 |
| EP | 2682493 | B1 | 10/2015 |
| JP | 59219534 | A | 12/1984 |
| JP | 61013038 | | 1/1986 |
| JP | 63076730 | A | 4/1988 |
| JP | 04000304 | A | 1/1992 |
| JP | 05031671 | A | 2/1993 |
| JP | 10146634 | A | 6/1998 |
| JP | 2000103216 | A | 4/2000 |
| JP | 2002168278 | A | 6/2002 |
| JP | 2002257169 | A | 9/2002 |
| JP | 2004050906 | A | 2/2004 |
| JP | 2005171297 | A | 6/2005 |
| JP | 2006022402 | A | 1/2006 |
| JP | 2007308067 | A | 11/2007 |
| JP | 2010255742 | A | 11/2010 |
| JP | 2011000663 | A | 1/2011 |
| JP | 2011131338 | A | 7/2011 |
| JP | 2012057777 | A | 3/2012 |
| JP | 2014122652 | A | 7/2014 |
| WO | 2011077985 | A1 | 6/2011 |
| WO | 2014077327 | A1 | 5/2014 |

OTHER PUBLICATIONS

Extended European Search Report (EESR) dated Dec. 21, 2017 issued in counterpart European Application No. 14893187.6.
International Search Report (ISR) issued in International Application No. PCT/JP2014/064165.
Japanese Office Action (and English translation thereof) dated Mar. 29, 2016, issued in counterpart Japanese Application No. 2012-278069.
European Office Action (and English translation thereof) dated Nov. 8, 2019 in counterpart European Application No. 14893187.6.
Warmgeformte Federn—Konstruktion und Fertigung (Thermoformed Springs—Construction and Manufacturing), 1987, pp. 7 & 130-135.

METHOD OF MANUFACTURING A SUSPENSION COIL SPRING

CROSS REFERENCE TO RELATED APPLICATIONS

This application is a Divisional application of U.S. application Ser. No. 14/789,779, filed Jul. 1, 2015, which is a Continuation Application of PCT Application No. PCT/JP2014/064165, filed May 28, 2014 and based upon the prior Japanese Patent Application No. 2012-278069, filed Dec. 20, 2012. The entire contents of all the above-identified applications are incorporated herein by reference.

BACKGROUND OF THE INVENTION

1. Field of the Invention

The present invention relates to a suspension spring apparatus used for a suspension mechanism of a vehicle such as a car, and a suspension coil spring.

2. Description of the Related Art

Patent Literature 1 (JP 2000-103216A) discloses an example of a suspension spring apparatus used for a suspension mechanism of a vehicle such as a car. The suspension spring apparatus includes a suspension coil spring (a compression coil spring), a lower spring seat disposed on the lower side of the coil spring, and an upper spring seat disposed on the upper side of the coil spring. The coil spring is extended and retracted in accordance with the magnitude of the load.

As one cause of breaking of the suspension coil spring, a corrosion pit is known. Rust is formed as the coating of the coil spring comes off by, for example, pebbles which have been spattered, and a corrosion pit is formed as this rust grows. The coil spring breaks at the corrosion pit. As disclosed in Patent Literature 2 (JP 2005-171297A), it has been proposed to form a coating film of two-layer structure on the surface of a suspension coil spring. The coating film of two-layer structure is comprised of an epoxy resin based undercoat layer, and an epoxy polyester resin based topcoat layer formed on the undercoat layer. Patent Literature 3 (JP 2011-000663A) describes first shot peening and second shot peening. In the first shot peening, first shot peening is performed for the entire coil spring with large projection energy. After the first shot peening has been performed, second shot peening is performed with less projection energy.

An end turn portion of the suspension coil spring includes a first portion, a second portion, and a third portion. The first portion is always in contact with the spring seat irrespective of the magnitude of the load. The second portion contacts the spring seat or is separated from the spring seat depending on the magnitude of the load. The third portion is always separated from the spring seat irrespective of the magnitude of the load. Foreign substances such as sand may be caught between the second portion and the spring seat. Rust-inhibiting coating is applied to the surface of the coil spring. However, when the coil spring is extended and retracted in a state where the hard foreign substances such as sand are caught between the end turn portion and the spring seat, the coating film may come off which would form rust, or the surface of the coil spring may be damaged by the interposed foreign substances. Rust is formed in the flaw, and when the rust grows, it becomes the cause of the coil spring to be broken.

As in the coil spring of Patent Literature 1 (JP 2000-103216A), when a part of the end turn portion contacts the spring seat or is separated from the same, foreign substances such as sand easily enter into space particularly between the lower end turn portion and the spring seat. When the foreign substances are caught between the end turn portion and the spring seat, the coating film comes off and rust is formed, which causes the coil spring to be broken.

As described in Patent Literature 2 (JP 2005-171297A), a coil spring having a coating film of two-layer structure which is constituted by an undercoat layer and a topcoat layer is effective against spattered pebbles. However, the above is not effective against corrosion or a flaw which is caused by sand, etc., which has entered between the end turn portion and the spring seat. Moreover, the coating film of two-layer structure has the problem that the cost to be the incurred by coating is high as compared to a coil spring having a general coating film. In Patent Literature 3 (JP 2011-000663A), both the first shot peening and the second shot peening are performed for the entirety of the coil spring. Further, in the first shot peening, since shots are projected at the entirety of the coil spring with large projection energy, there is a problem that energy consumption is high. Furthermore, since a shot peening apparatus which can withstand large projection energy is necessary, wearing of the shot peening apparatus is also significant.

BRIEF SUMMARY OF THE INVENTION

Accordingly, an object of the present invention is to provide a suspension spring apparatus capable of preventing a coil spring from being broken by a corrosion produced in an end turn portion, and a suspension coil spring.

A suspension spring apparatus of the present invention comprises a lower spring seat, an upper spring seat, and a coil spring which has a wire formed into a helical shape, and arranged in a state in which the coil spring is compressed between the lower spring seat and the upper spring seat. The coil spring comprises a lower end turn portion which is less than one turn from a lower end of the wire, and an upper end turn portion which is less than one turn from an upper end of the wire. Here, at least the lower end turn portion comprises a first portion which is always in contact with the lower spring seat irrespective of magnitude of a load applied to the coil spring, a second portion which contacts the lower spring seat or is separated from the same in accordance with the load applied to the coil spring, and a third portion which is always separated from the spring seat irrespective of the magnitude of the load. The coil spring comprises a compressive residual stress portion to which a compressive residual stress from a surface of the wire to a first depth is imparted between the lower end turn portion and the upper end turn portion, and a deep residual stress portion to which a compressive residual stress from a surface of the wire to a second depth that is deeper than the first depth is imparted in a region including the second portion of the lower end turn portion.

According to the present invention, it is possible to prevent a coil spring from being broken at corrosion which is produced by hard foreign substances such as sand caught between the end turn portion and the spring seat of the suspension coil spring, thereby improving durability of the coil spring. In the coil spring, a deep residual stress portion should be formed by ultrasonic shot peening, for example, at a region including at least the second portion (the portion which contacts the spring seat or is separated from the same) of the end turn portion.

In one embodiment, the maximum of the absolute value of the compressive residual stress of the deep residual stress portion is greater than the maximum of the absolute value of the compressive residual stress of the compressive residual stress portion. Further, preferably, a stress transition portion in which the compressive residual stress gradually reduces should be provided at a boundary between the deep residual stress portion and the compressive residual stress portion. Furthermore, a first shot peening indentation is formed on the surface of the compressive residual stress portion, a second shot peening indentation is formed on the surface of the deep residual stress portion, and the size of the second shot peening indentation is larger than the size of the first shot peening indentation. Also, the deep residual stress portion may be formed at both the lower end turn portion and the upper end turn portion.

In one embodiment, the lower spring seat comprises a bottom surface and an outer sidewall which restrain a lower surface and an outer peripheral surface of the lower end turn portion, respectively, and the deep residual stress portion is formed in a range including the lower surface and the outer peripheral surface of the lower end turn portion. In another embodiment, the lower spring seat may comprise a bottom surface and an inner sidewall which restrain a lower surface and an inner peripheral surface of the lower end turn portion, respectively, and the deep residual stress portion may be formed in a range including the lower surface and the inner peripheral surface of the lower end turn portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A suspension spring apparatus according to a first embodiment will now be described with reference to FIGS. 1 to 9.

Figure 1:
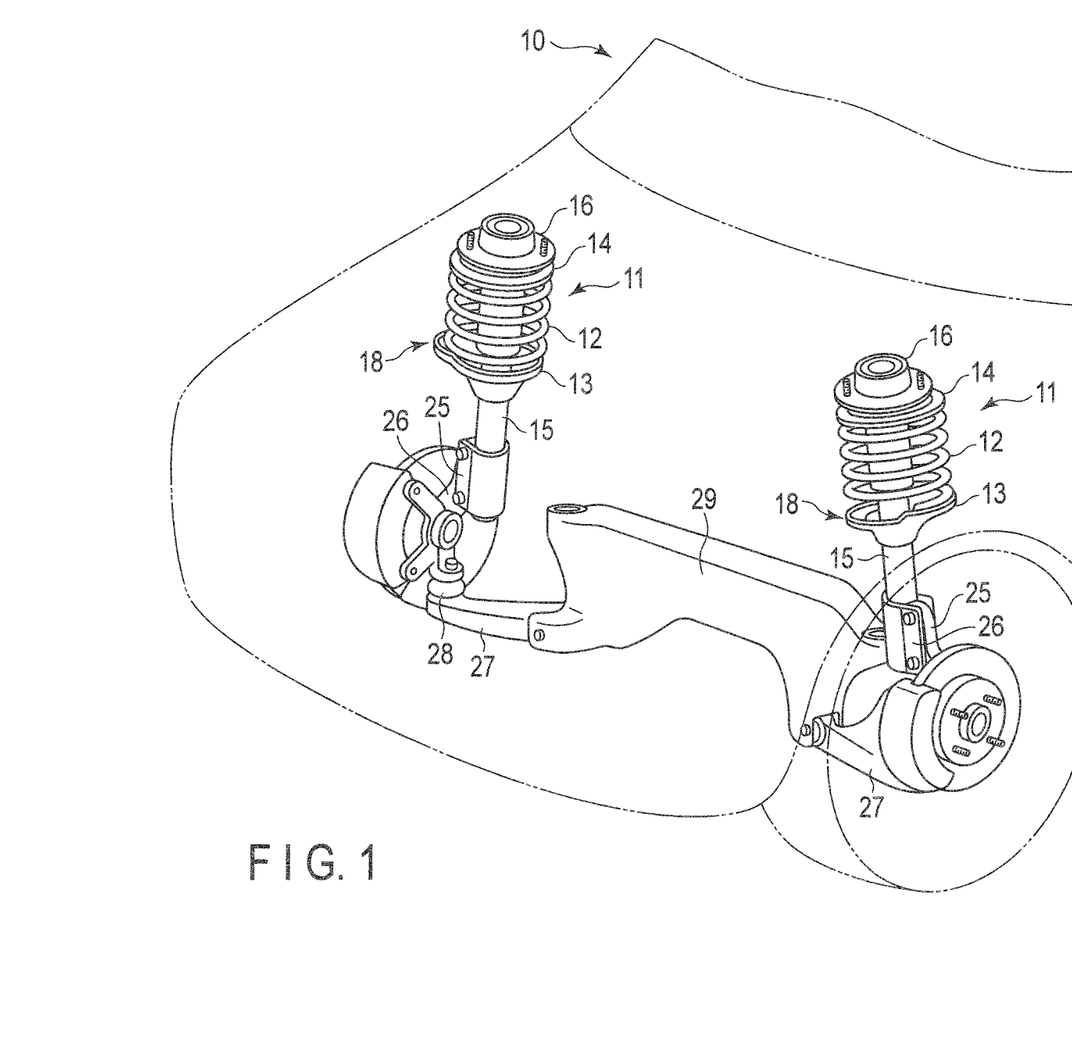
FIG. 1 is a perspective view which schematically shows the front part of a vehicle comprising a suspension spring apparatus.
Figure 2:
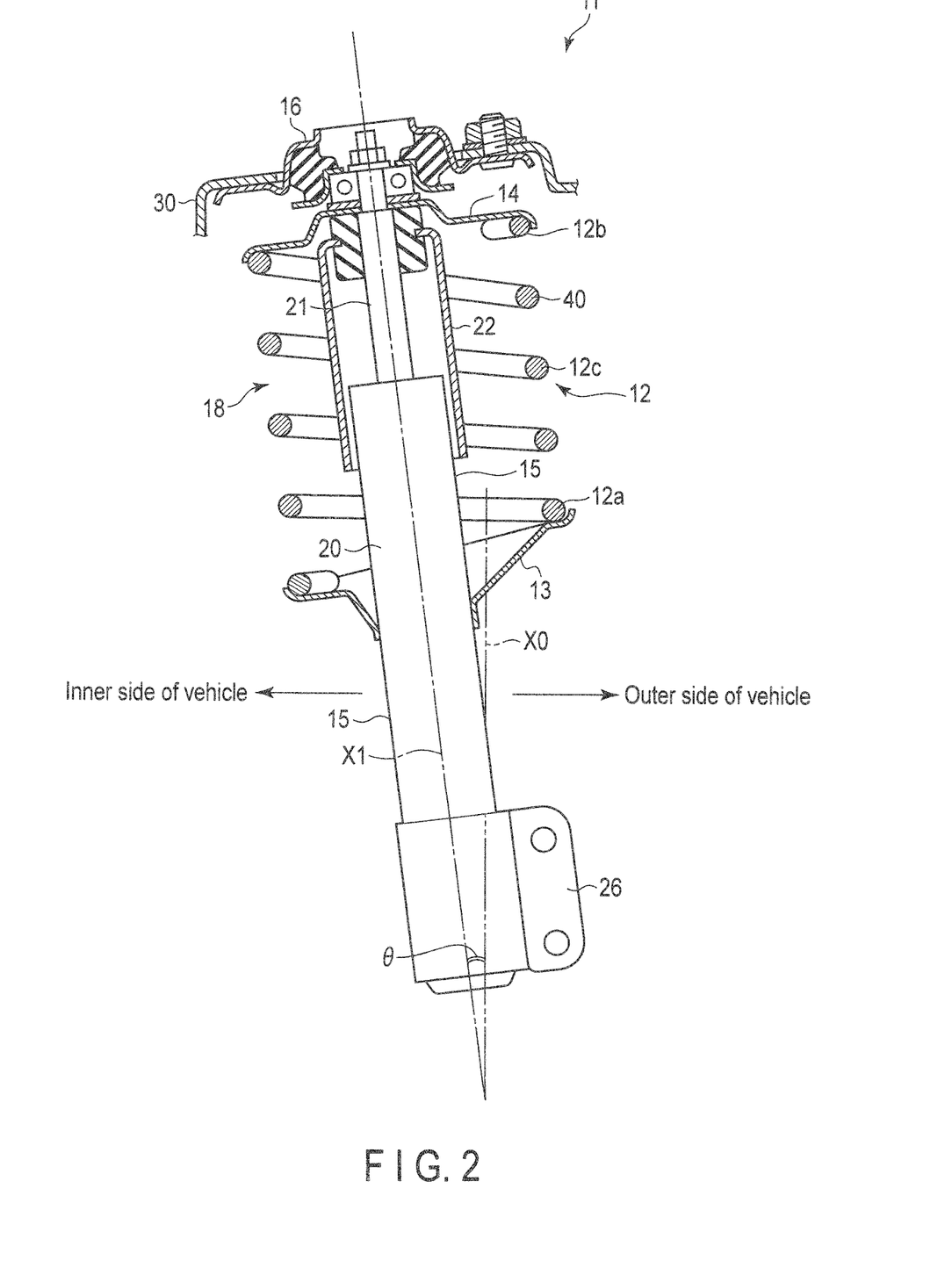
FIG. 2 is a longitudinal sectional view of a suspension mechanism comprising the suspension spring apparatus shown in FIG. 1.

FIGS. 1 and 2 show a McPherson-strut-type suspension mechanism 11 used on the front side of a vehicle 10. The suspension mechanism 11 comprises a coil spring 12 (a compression coil spring), a lower spring seat 13, an upper spring seat 14, a shock absorber 15, and a mount insulator 16. The coil spring 12 is an example of a suspension coil spring. The lower spring seat 13 is disposed on the lower side of the coil spring 12. The upper spring seat 14 is disposed on the upper side of the coil spring 12. The coil spring 12 is arranged in such a state that it is compressed between the lower spring seat 13 and the upper spring seat 14. A suspension spring apparatus 18 is constituted by the coil spring 12 and the spring seats 13 and 14.

The shock absorber 15 comprises a cylinder 20, a rod 21, a damping force generation mechanism provided inside the cylinder 20, a cover member 22, etc. Fluid such as oil is contained in the cylinder 20. The rod 21 is inserted into the cylinder 20. The cover member 22 covers a sliding portion of the rod 21. The rod 21 can be extended and retracted in the direction of axis X1 of the shock absorber 15 relative to the cylinder 20. The damping force generation mechanism applies resistance to the movement of the rod 21. The shock absorber 15 is mounted in a vehicle body 30 in such a position that it is inclined by angle θ with respect to vertical line $X_0$.

On a lower end portion of the cylinder 20, a bracket 26 for mounting a knuckle member 25 (FIG. 1) is provided. The lower part of the knuckle member 25 is pivotably supported on a lower arm 27 via a ball joint 28. The lower arm 27 is mounted on a cross-member 29 such that it can be moved up and down. The cross-member 29 extends in the width direction of the vehicle 10.

Figure 3:
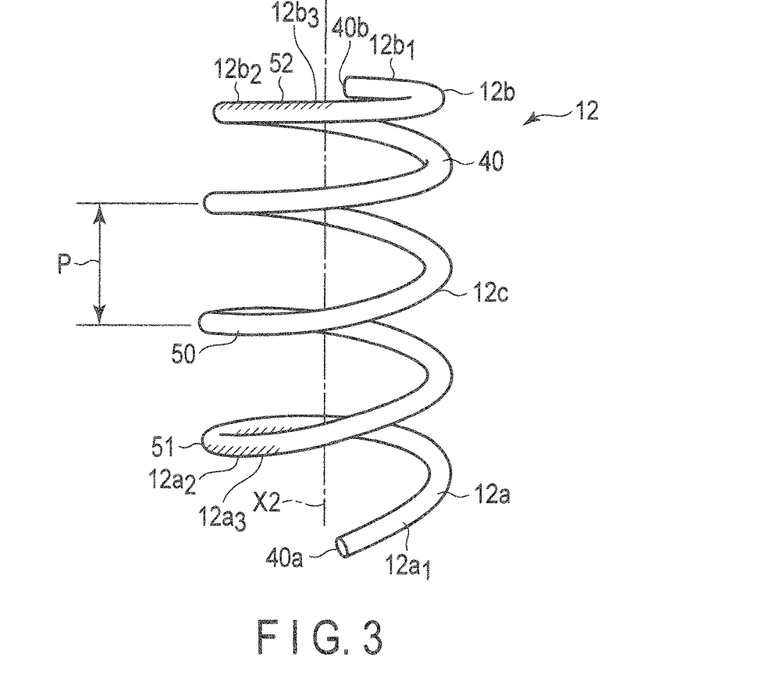
FIG. 3 is a perspective view showing an example of a coil spring.

FIG. 3 shows the state in which no compressive load is applied to the coil spring 12 (i.e., the so-called free state). In this specification, a length of the coil spring 12 in the free state is referred to as a free length. When a load is applied to the coil spring 12, the coil spring 12 is deformed in the direction of making the length shorter than the free length. The suspension spring apparatus 18 shown in FIG. 2 is mounted in the vehicle body 30 in an assembly state in which the coil spring 12 is compressed between the lower spring seat 13 and the upper spring seat 14.

The coil spring 12 shown in FIG. 3 comprises a wire 40 formed into a helical shape. The wire 40 is formed of spring steel having a circular cross-section. The coil spring 12 comprises a lower end turn portion 12a, and an upper end turn portion 12b. The lower end turn portion 12a is the part that is less than one turn from a lower end 40a of the wire 40. The upper end turn portion 12b is the part that is less than one turn from an upper end 40b of the wire 40. A helical effective portion 12c is formed between end turn portions 12a and 12b. The effective portion 12c is wound at pitch P by which no contact is made in the wire 40 even when the coil spring 12 is compressed at the maximum.

The diameter of the wire 40 is, for example, 12.5 mm. In an example of the coil spring 12, an average coil diameter is 110.0 mm, the free length (i.e., the length when no load is applied) is 382 mm, the number of effective turns is 5.39, the spring constant is 33.3 N/mm. Although the wire diameter is mainly 8 to 21 mm, a wire diameter which does not fall within this range may be adopted. An example of the coil spring 12 is a cylindrical coil spring. In the other embodiments of a coil spring, according to the specification of the suspension mechanism, a coil spring such as a barrel-shaped coil spring, an hourglass coil spring, a tapered coil spring, a variable pitch coil spring, or a coil spring having its central axis already curved in the free state, may be employed.

The wire 40 is formed of spring steel. Although the type of spring steel is not limited, SAE 9254, which is the steel conforming to the U.S. Society of Automotive Engineers standard is given as an instance. The chemical components (mass %) of SAE 9254 are C: 0.51 to 0.59; Si: 1.20 to 1.60; Mn: 0.60 to 0.80; Cr: 0.60 to 0.80; S: 0.040 max.; P: 0.030 max.; and Fe: the remainder. Another example of the spring steel may be ultra-high-strength spring steel. As an example, the chemical components (mass %) of the ultra-high-strength spring steel are C: 0.40; Si: 1.8; Mn: 0.3; Cr: 1.05; P: 0.010; S: 0.005; Ni: 0.4; Cu: 0.25; V: 0.18; Ti: 0.07; and Fe: the remainder.

The coil spring 12 is arranged in such a state that it is compressed between the lower spring seat 13 and the upper spring seat 14. Further, the coil spring 12 elastically supports a load applied from above the vehicle 10. The lower end turn portion 12a contacts an upper surface of the spring seat 13. The upper end turn portion 12b contacts a lower surface of the spring seat 14. The coil spring 12 is extended to the maximum at the time of full-rebound, and compressed to the maximum at the time of full-bump. The "full-rebound" state refers to a state where the coil spring 12 is extended to the maximum by the unsprung mass when the vehicle body is lifted. The "full-bump" state refers to a state where the coil spring 12 is compressed to the maximum by a load applied from the upper side of the vehicle body.

Figure 4:
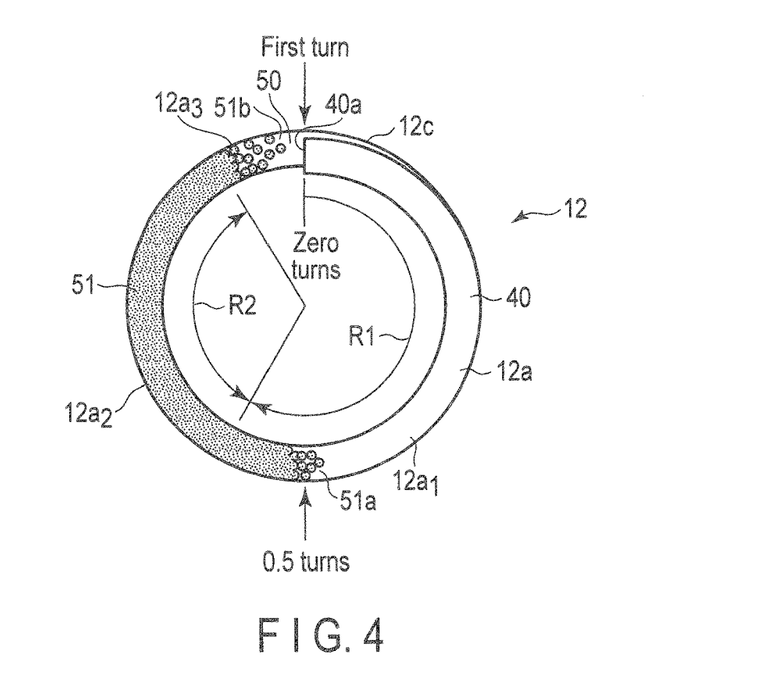
FIG. 4 is a bottom view which schematically shows an end turn portion of a coil spring according to a first embodiment.

FIG. 4 is a bottom view which schematically shows end turn portion 12a of the coil spring 12. End turn portion 12a comprises a first portion $12a_1$ in a range shown by arrow R1, a second portion $12a_2$ in a range shown by arrow R2, and a third portion $12a_3$, in the direction in which the wire 40 is wound. The first portion $12a_1$ extends in a range exceeding the range from the lower end 40a of the wire 40 (i.e., zero turns) to 0.5 turns, that is, in the range from zero turns to around 0.6 turns, for example. The first portion $12a_1$ is always in contact with the spring seat 13 irrespective of a load applied to the coil spring 12.

The second portion $12a_2$ is contiguous with the first portion $12a_1$. The second portion $12a_2$ extends to a point less than one turn from the lower end 40a of the wire 40 (for example, in the range from around 0.6 turns to around 0.9 turns). The second portion $12a_2$ contacts the spring seat 13 or is separated from the same in accordance with the load applied to the coil spring 12. That is, the second portion $12a_2$ is separated from the spring seat 13 when the load is small, and contacts the spring seat 13 when it is large. The third portion $12a_3$ is always separated from the spring seat 13 irrespective of the magnitude of the load.

Likewise the lower end turn portion 12a, the upper end turn portion 12b also comprises a first portion $12b_1$, a second portion $12b_2$, and a third portion $12b_3$. The first portion $12b_1$ extends in a range exceeding the range from the upper end 40b of the wire 40 (i.e., zero turns) to 0.5 turns. The first portion $12b_1$ always contacts the spring seat 14 irrespective of a load applied to the coil spring 12. The second portion $12b_2$ is contiguous with the first portion $12b_1$. The second portion $12b_2$ extends to a point less than one turn from the upper end 40b of the wire 40 (for example, in the range from around 0.6 turns to around 0.9 turns). The second portion $12b_2$ contacts the spring seat 14 or is separated from the spring seat 14 in accordance with the load applied to the coil spring 12. The third portion $12b_3$ is always separated from the spring seat 14 irrespective of the magnitude of the load.

The coil spring 12 comprises a compressive residual stress portion 50, and deep residual stress portions 51 and 52. The compressive residual stress portion 50 is formed between end turn portions 12a and 12b. Deep residual stress portions 51 and 52 are formed at end turn portions 12a and 12b, respectively. A compressive residual stress is imparted to the compressive residual stress portion 50 up to a first depth from the surface of the wire 40.

A first deep residual stress portion 51 is formed at the lower end turn portion 12a. The first deep residual stress portion 51 is formed in a region including at least the second portion $12a_2$ of end turn portion 12a. A compressive residual stress is imparted to the deep residual stress portion 51 up to a second depth. A second deep residual stress portion 52 is formed at the upper end turn portion 12b. The second deep residual stress portion 52 is formed in a region including the second portion $12b_2$ of end turn portion 12b. A compressive residual stress is also imparted to deep residual stress portion 52 up to the second depth.

FIG. 3 represents deep residual stress portions 51 and 52 by oblique parallel lines (hatching). For convenience of explanation, FIG. 4 represents deep residual stress portion 51 in a satin pattern. Deep residual stress portion 51 is formed in a range which covers the entire area of the second portion $12a_2$ of end turn portion 12a. One end 51a of deep residual stress portion 51 is positioned in the first portion $12a_1$ of end turn portion 12a. The other end 51b of deep residual stress portion 51 is contiguous with the compressive residual stress portion 50 formed in the effective portion 12c.

As described above, deep residual stress portion 51 on the lower side is formed in a region including the second portion $12a_2$ of the lower end turn portion 12a, that is, in a region which has the possibility of contacting with the spring seat 13 or separating from the same. Deep residual stress portion 51 may be formed such that it extends between the second portion $12a_2$ and the third portion $12a_3$.

The first portion $12a_1$ of end turn portion 12a is always in contact with the spring seat 13. Accordingly, the one end 51a of deep residual stress portion 51 is always in contact with the spring seat 13. The other end 51b of deep residual stress portion 51, that is, the boundary between deep residual stress portion 51 and the compressive residual stress portion 50 constitutes a stress transition portion. In the stress transition portion, the farther the wire turn is positioned from the lower end 40a (i.e., the greater the number that represents the position of wire turns becomes), the less the compressive residual stress becomes gradually. This stress transition portion enables to prevent tensile residual stress from being produced around the other end 51b, as well as preventing the compressive residual stress around the other end 51b from changing rapidly.

Likewise, deep residual stress portion 52 is formed at the upper end turn portion 12b. As in deep residual stress portion 51 on the lower side, deep residual stress portion 52 is formed in a range which covers the entire area of the second portion 12$b_2$ of end turn portion 12b. That is, deep residual stress portion 52 on the upper side is formed in a region including the second portion 12$b_2$ of the lower end turn portion 12b, that is, in a region which has the possibility of contacting with the spring seat 14 or separating from the same. Deep residual stress portion 52 may be formed such that it extends between the second portion 12$b_2$ and the third portion 12$b_3$.

Figure 5:
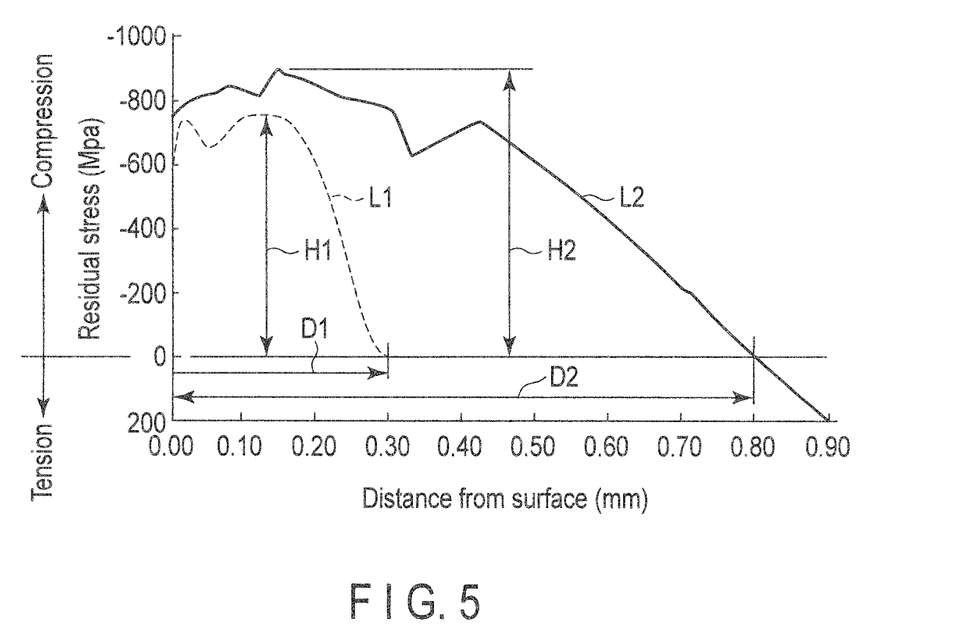
FIG. 5 is a graph showing a distribution of a residual stress of each of a compressive residual stress portion and a deep residual stress portion.

FIG. 5 represents a stress distribution of the compressive residual stress portion 50 (broken line L1), and a stress distribution of deep residual stress portions 51 and 52 (solid line L2). The horizontal axis in FIG. 5 represents a depth (a distance) from the surface of the wire 40. Although the vertical axis in FIG. 5 represents a residual stress value, in accordance with the custom of the present technical field, the compressive residual stress value is expressed as a negative value. As shown by broken line L1 in FIG. 5, from the surface of the wire 40 to first depth D1 (the depth of approximately 0.30 mm), a compressive residual stress is formed in the compressive residual stress portion 50. The maximum value (the absolute value) H1 of a stress of the compressive residual stress portion 50 is approximately 750 MPa.

Solid line L2 in FIG. 5 represents a stress distribution of deep residual stress portions 51 and 52. In deep residual stress portions 51 and 52, a compressive residual stress is formed up to second depth D2 (the depth of approximately 0.8 mm) from the surface of the wire 40. That is, in deep residual stress portions 51 and 52, a compressive residual stress is formed up to a deeper position than it is formed in the compressive residual stress portion 50. Moreover, the maximum value (the absolute value) H2 of the compressive residual stress of deep residual stress portions 51 and 52 reaches 900 MPa. That is, the maximum value (the absolute value) H2 of the compressive residual stress of deep residual stress portions 51 and 52 is greater than the maximum value (the absolute value) H1 of the compressive residual stress of the compressive residual stress portion 50. Note that H2 may be equivalent to H1 or smaller than H1.

Figure 6:
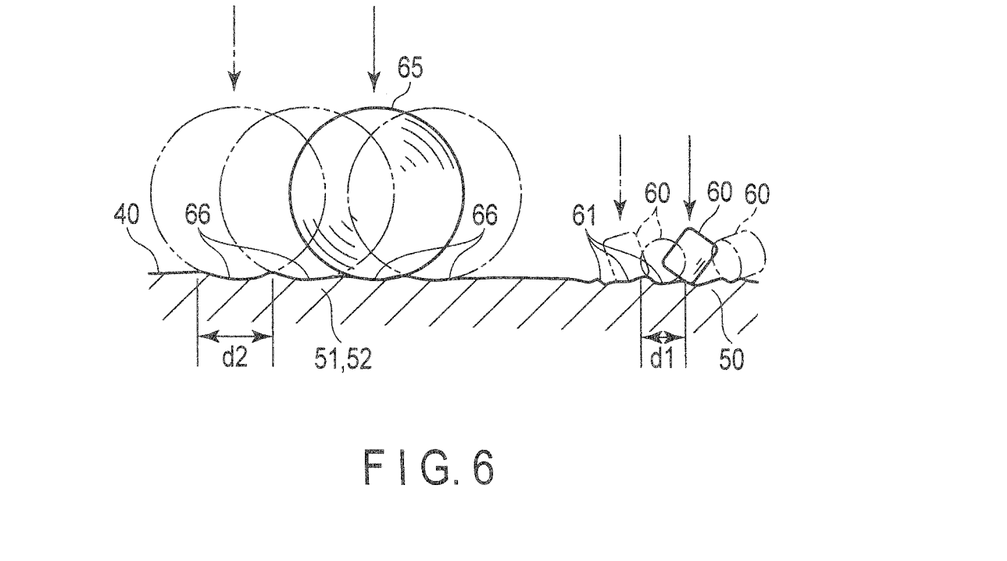
FIG. 6 is a cross-sectional view which schematically shows portions near the surfaces of the compressive residual stress portion and the deep residual stress portion, and shots that are used.

FIG. 6 is a cross-sectional view which schematically shows portions near the surfaces of the compressive residual stress portion 50 and deep residual stress portions 51 and 52. On the surface of the compressive residual stress portion 50, a first shot peening indentation 61 is formed. The first shot peening indentation 61 is formed by a shot 60 projected during first shot peening to be described later. In this way, a compressive residual stress is imparted to the compressive residual stress portion 50 up to first depth D1 (FIG. 5) from the surface.

On the surface of deep residual stress portions 51 and 52, a second shot peening indentation 66 is formed. The second shot peening indentation 66 is formed by a steel-ball shot 65 projected during second shot peening (ultrasonic shot peening). In this way, a compressive residual stress which is greater than that of the compressive residual stress portion 50 is imparted to deep residual stress portions 51 and 52 up to second depth D2 (FIG. 5) from the surface. Note that the absolute value of the compressive residual stress of deep residual stress portions 51 and 52 may be equal to or smaller than the absolute value of the compressive residual stress of the compressive residual stress portion 50.

The compressive residual stress portion 50 is formed by the first shot peening. In the first shot peening, an impeller (a turbine rotor) of a centrifugal accelerator is rotated. Further, the shot 60 is hit on the entirety of the coil spring 12 by centrifugal force produced by high-speed rotation of the impeller. An example of the shot 60 (FIG. 6) is a cut wire. An example of the size of the shot is 0.67 mm, and the projection velocity is 77 m/s. Although a new cut wire is cylindrical, a cut wire which has been used for some time is rounded without sharp edges. By the first shot peening, not only a number of indentations 61 each having indentation size d1 (FIG. 6) are formed on the surface of the wire 40, but also a compressive residual stress is produced from the surface of the wire 40 to the aforementioned first depth D1.

Figure 7:
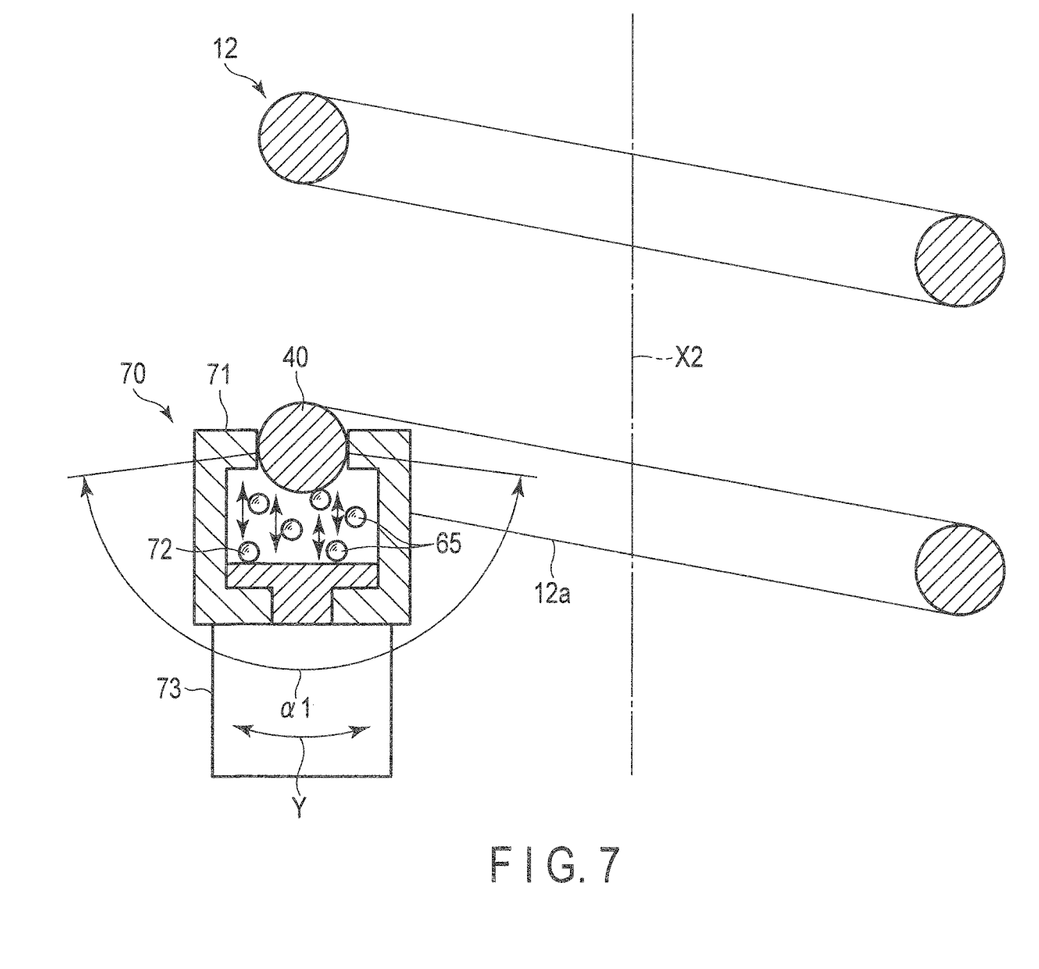
FIG. 7 is a cross-sectional view which schematically shows an ultrasonic shot peening apparatus for forming the deep residual stress portion and a part of a coil spring.

FIG. 7 schematically depicts an ultrasonic shot peening apparatus 70 which performs the second shot peening. The ultrasonic shot peening apparatus 70 comprises a housing 71, an ultrasonic oscillator 72, an actuator 73, and a plurality of steel-ball shots 65. The housing 71 serves as masking means. The ultrasonic oscillator 72 is arranged inside the housing 71. The steel-ball shots 65 are accommodated to be movable within the housing 71. Each of the steel-ball shots 65 is substantially a perfect sphere and has a smooth surface as in steel balls of, for example, a ball bearing. The diameter of each steel-ball shot 65 is, for example, 3 to 4 mm. The diameter of each steel-ball shot 65 is remarkably larger than the size of the shot 60 (for example, 0.6 to 1.2 mm) which is used in the first shot peening. Moreover, the steel-ball shot 65 has its surface smooth as compared to a shot 60 in general and is almost a perfect sphere.

For instance, the hardness of the steel-ball shot 65 is 670 HV. The housing 71 is provided to cover a to-be-projected region of the wire 40. In this state, the ultrasonic oscillator 72 is oscillated at a frequency of 20 kHz, and an amplitude of 150 μm, for example, by means of the actuator 73. The steel-ball shots 65 are thereby projected toward the wire 40 within the housing 71. For example, the projection time of the steel-ball shots 65 is 80 seconds, the projection distance is 90 mm, and an arc height (grade C) is 0.289 mm.

A number of steel-ball shots 65 are projected from the ultrasonic oscillator 72 toward the wire 40. These steel-ball shots 65 collide against the surface of the wire 40 and bounce back, and are projected toward the wire 40 again by the ultrasonic oscillator 72. As the projection and reflection of the steel-ball shots 65 are repeated in this way, as shown in FIG. 6, the second shot peening indentation 66 having indentation size (indentation diameter) d2 is formed. Indentation size d2 of the second shot peening indentation 66 is greater than indentation size d1 of the first shot peening indentation 61.

The greater the shot size is, the greater the mass becomes. Consequently, the kinetic energy of the steel-ball shot 65 used in the second shot peening is significantly large as compared to that of the shot 60 used in the first shot peening. Thus, with the second shot peening, as shown by line segment L2 in FIG. 5, a great compressive residual stress is produced from the surface to depth D2. Moreover, the maximum value (the absolute value) H2 of the compressive residual stress of deep residual stress portions 51 and 52 is greater than the maximum value (the absolute value) H1 of the compressive residual stress of the compressive residual stress portion 50.

As described above, the steel-ball shots 65 are hit on the coil spring 12 by the ultrasonic shot peening apparatus 70. The diameter of the steel-ball shot 65 is, for example, 4 mm, and is greater than the size of the shot 60 used in the first shot peening by more than three times. Further, since the surface of the steel-ball shot 65 is almost a perfect sphere, indentation size d2 of the second shot peening indentation 66 is greater than indentation size d1 of the first shot peening indentation 61. Furthermore, the surface of the second shot peening indentation 66 is smooth. Accordingly, it is possible to prevent the second shot peening indentation 66 formed in end turn portion 12a from being a starting point of breaking of the coil spring 12.

Figure 8:
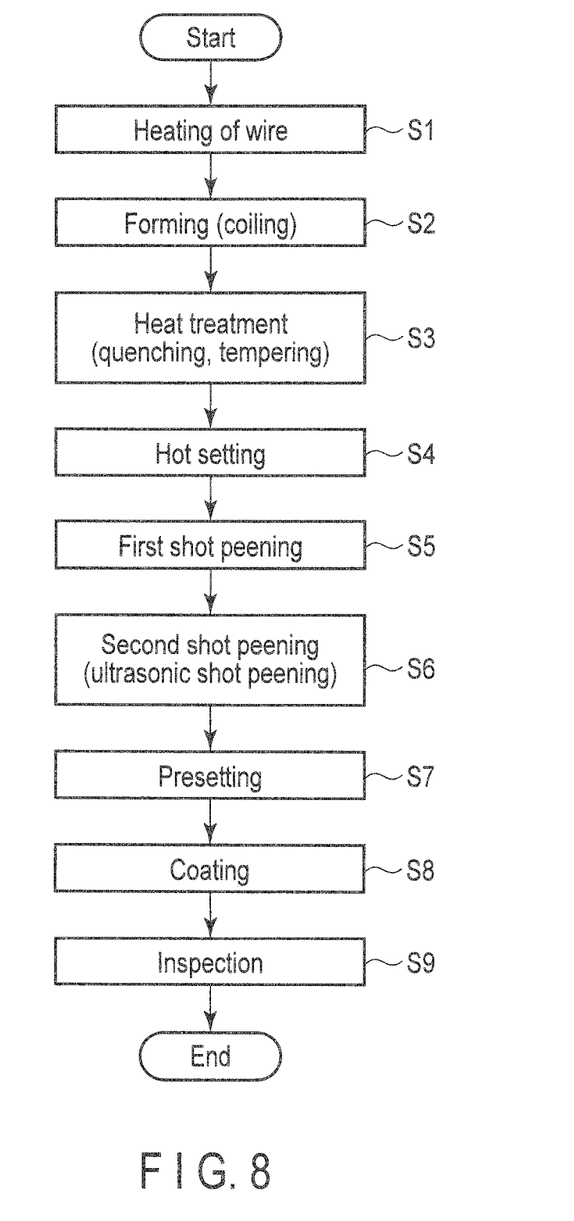
FIG. 8 is a flowchart showing an example of a manufacturing process of the coil spring shown in FIG. 3.

FIG. 8 shows an example of a manufacturing process of a case where the coil spring 12 is formed in a hot working temperature range.

In heating step S1 in FIG. 8, a material (a wire) of the coil spring 12 is heated to an austenitizing temperature (i.e., higher than $A_3$ transformation point and lower than 1150° C.). Next, in formation step S2, the material is wound into a helical shape. Thereafter, in heat treatment step S3, the wire is subjected to heat treatment of quenching and tempering. In heat treatment step S3, the wire is subjected to thermal refining so that the hardness of the wire becomes 47 to 59 HRC. After that, by utilizing the remaining heat of heat treatment step S3, hot setting step S4 is performed at a warm working temperature (150 to 350° C.). In hot setting step S4, a load in the axial direction of the coil spring 12 is applied to the coil spring 12 for a predetermined time.

Further, in first shot peening step S5, the first shot peening is performed in the warm working temperature range. In first shot peening step S5, a shot (i.e., an iron cut wire) whose shot size (grain diameter) is 0.67 mm is used. This shot is projected at the wire at a velocity of 77 m/s at a processing temperature of 230° C. In this way, the compressive residual stress portion 50 is formed in the entirety of the coil spring 12 up to first depth D1. Note that in first shot peening step S5, a shot having the shot size of 1.1 mm may be projected at a velocity of 77 m/s at a processing temperature of 230° C.

Also, multistage shot peening may be applied to first shot peening step S5. In multistage shot peening, shot peening is performed separately in two stages or three stages or more. Preceding shot peening is performed by using a large-size shot having the shot size of, for example, 0.87 to 1.2 mm, and subsequent shot peening may thereafter be carried out by using a small-size shot having the shot size of, for example, 0.4 to 0.7 mm.

In second shot peening step S6, second shot peening (ultrasonic shot peening) is carried out by using the ultrasonic shot peening apparatus 70. The second shot peening is performed at a temperature lower than that of the first shot peening (for example, room temperature). Also, in the second shot peening, the steel-ball shots 65 each having the diameter of 4 mm, which is significantly larger than the size of the shot 60 of the first shot peening, is used. The projection time of the steel-ball shots 65 is, for example, 80 seconds.

As shown in FIG. 7, the steel-ball shots 65 are projected at the surface of the wire 40 by the ultrasonic shot peening apparatus 70. As a result, deep residual stress portion 51 is formed throughout the range of angle α1 on the lower surface of end turn portion 12a. At this time, the ultrasonic shot peening apparatus 70 may be moved in the directions of double-headed arrow Y.

The ultrasonic shot peening apparatus 70 moves from the one end 51a of deep residual stress portion 51 to the other end 51b (FIG. 4). A compressive residual stress at second depth D2 is thereby produced in deep residual stress portion 51. The other end 51b of deep residual stress portion 51 is the stress transition portion. In the stress transition portion, the compressive residual stress is gradually reduced from deep residual stress portion 51 to the compressive residual stress portion 50. At the other end 51b of deep residual stress portion 51, in order to form the stress transition portion, a moving velocity of the ultrasonic shot peening apparatus 70 is gradually increased or a projection velocity of the steel-ball shots 65 is gradually reduced. In this way, the compressive residual stress can be reduced from deep residual stress portion 51 to the compressive residual stress portion 50.

When deep residual stress portion 52 is to be formed at the upper end turn portion 12b, contrary to what is shown in FIG. 7, by placing the upper end turn portion 12b upside down, the steel-ball shots 65 are projected toward end turn portion 12b by the ultrasonic oscillator 72 from the lower side of end turn portion 12b.

The outer diameter of the steel-ball shot 65 used in second shot peening step S6 is significantly large as compared to the size of the shot used in first shot peening step S5. Moreover, the steel-ball shot 65 is substantially a perfect sphere and the surface thereof is smooth. Accordingly, the state of the surface of the wire for which first shot peening step S5 is performed can be improved by second shot peening step S6. The average surface roughness of the compressive residual stress portion 50 after first shot peening step S5 is, for example, 5.4 μm. In contrast, the average surface roughness of deep residual stress portions 51 and 52 after second shot peening step S6 is, for example, 5.1 μm.

By second shot peening step S6, deep residual stress portions 51 and 52 are formed in end turn portions 12a and 12b, respectively. In the parts where deep residual stress portions 51 and 52 are formed, the compressive residual stress portion 50 which has been formed by the first shot peening is canceled. Accordingly, a region between deep residual stress portions 51 and 52 remains as the compressive residual stress portion 50.

After second shot peening step S6 has been finished, presetting step S7 is carried out as necessary. In presetting step S7, the length of the coil spring when no load is applied (i.e., free length) is adjusted. By presetting step S7, the creeping property (the setting resistance) of the coil spring may be improved. Note that presetting step S7 may be omitted. Next, in coating step S8, rust-inhibiting coating is applied to the entirety of the coil spring by electrostatic painting, etc. Lastly, the coil spring is completed after quality inspection S9 has been performed.

The above explanation applies when the coil spring 12 is formed is by hot working. In contrast, when the coil spring 12 is formed by cold working, in a heat treatment step, heat treatment of quenching and tempering is performed for the wire. Thereafter, in a formation step (coiling step), the wire is formed into a helical shape. Then, a stress relief annealing step is carried out. In the stress relief annealing step, the coil spring is left as it is in an atmosphere of a predetermined temperature for a predetermined time, whereby the processing strain produced at the time of forming is eliminated. After that, in a hot setting step, hot setting is carried out.

Further, in a first shot peening step, the first shot peening as described above is carried out. In a second shot peening step which is performed after that, the second shot peening (ultrasonic shot peening) is carried out. Also, by carrying out a presetting step as necessary, the length of the coil spring when no load is applied (i.e., free length) is adjusted. After that, a coating step and quality inspection are performed. Note that the presetting step may be omitted.

As described above, in the coil spring 12 of the present embodiment, the compressive residual stress portion 50 is formed by first shot peening step S5. Further, by second shot peening step S6, deep residual stress portions 51 and 52 are formed in end turn portions 12a and 12b, respectively. That is, the coil spring 12 comprises the compressive residual stress portion 50 formed between end turn portions 12a and 12b, deep residual stress portion 51 formed at the lower end turn portion 12a, and deep residual stress portion 52 formed at the upper end turn portion 12b. On the compressive residual stress portion 50, the first shot peening indentation 61 is formed. On deep residual stress portions 51 and 52, the second shot peening indentation 66 is formed. Further, the maximum value H2 of the compressive residual stress of deep residual stress portions 51 and 52 is greater than the maximum value H1 of the compressive residual stress of the compressive residual stress portion 50. Note that H2 may be the same as H1 or smaller than H1.

The coil spring 12 is mounted on the shock absorber 15 in such a state that the compression coil spring 12 is compressed between the spring seats 13 and 14 and a preload is applied, and is further arranged in the vehicle body 30. A vertical load is applied to the suspension spring apparatus 18 which is mounted in the vehicle body 30. The coil spring 12 is deformed between the lower spring seat 13 and the upper spring seat 14 in accordance with the magnitude of this load. That is, the coil spring 12 is extended and retracted between a full-bump (the maximum compression state) and a full-rebound (the maximum expansion state) in accordance with the magnitude of the load.

In a state in which the coil spring 12 is extended, a gap between the lower spring seat 13 and the second portion 12$a_2$ or between the spring seat 13 and the third portion 12$a_3$ is increased. A gap between the upper spring seat 14 and the second portion 12$b_2$ or between the spring seat 14 and the third portion 12$b_3$ is also increased. Accordingly, hard foreign substances such as sand may enter into these gaps. In particular, sand can easily enter between the lower spring seat 13 and the second portion 12$a_2$ of end turn portion 12a.

Conversely, when the coil spring 12 is compressed, a gap between the lower spring seat 13 and the second portion 12$a_2$ or between the spring seat 13 and the third portion 12$a_3$ is reduced. A gap between the upper spring seat 14 and the second portion 12$b_2$ or between the spring seat 14 and the third portion 12$b_3$ is also reduced. Accordingly, when hard foreign substances such as sand have entered into the gaps at end turn portions 12a and 12b, the coating of the coil spring 12 may come off or the wire 40 may be damaged, which may cause rust in the wire 40.

In a conventional coil spring, when foreign substances such as sand are caught between the end turn portion and the spring seat, coating may come off and a corrosion pit may be formed. When the corrosion pit grows to some degree, there were cases where the coil spring broke at the corrosion pit. In contrast, in the aforementioned embodiment, a large compressive residual stress is imparted from a surface of a region including the second portion of the end turn portion to a deep position. Accordingly, it is possible to prevent the coil spring from being broken which is caused by the corrosion produced in the end turn portion, and durability can be improved. Further, depending on the structure of the suspension mechanism, it may be possible to prevent foreign substances such as sand from entering between the upper spring seat 14 and end turn portion 12b. In that case, deep residual stress portion 51 may be formed in only the lower end turn portion 12a.

Figure 9:
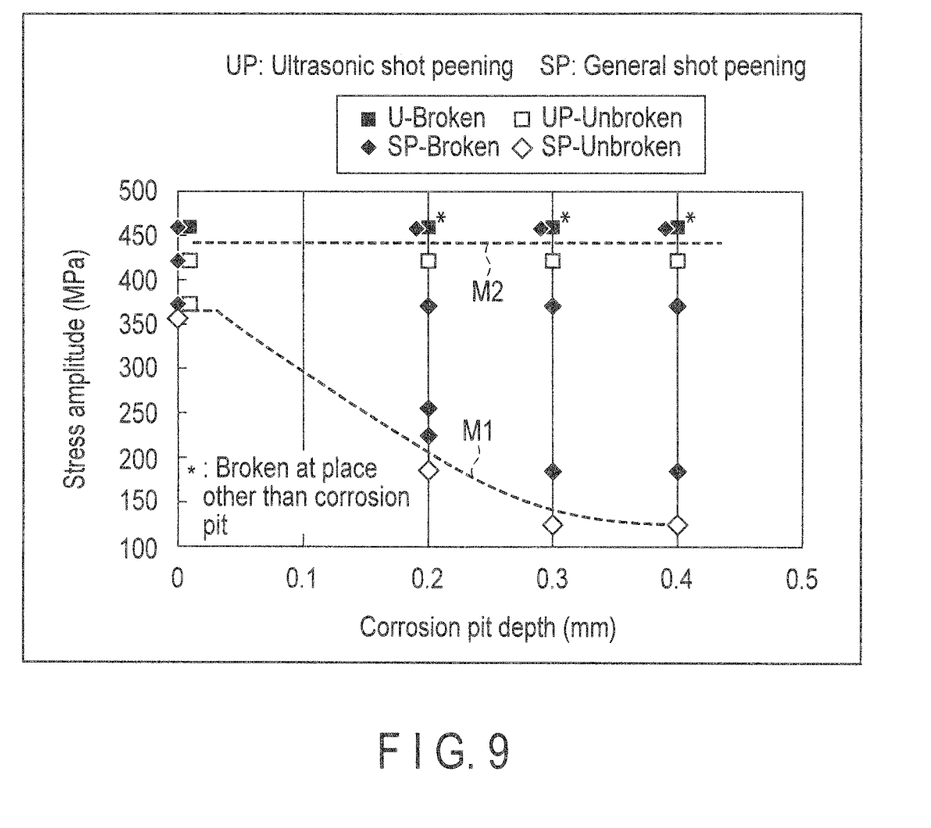
FIG. 9 is a graph showing results of endurance test of a coil spring having a compressive residual stress portion obtained by general shot peening, and a coil spring having a deep residual stress portion obtained by ultrasonic shot peening.

Line segment M1 in FIG. 9 represents a result of endurance test of a coil spring provided with only the compressive residual stress portion 50 which has been formed by general shot peening. Line segment M2 in FIG. 9 represents a result of endurance test of a coil spring provided with deep residual stress portions 51 and 52 which have been formed by the ultrasonic shot peening. In the endurance test, the coil spring having a corrosion pit was vibrated for a predetermined number of times, and whether the coil spring broke and the relationship between corrosion pit depth and stress amplitude were measured.

As shown by line segment M1 in FIG. 9, in the coil spring having only the compressive residual stress portion 50, when a depth of the corrosion pit exceeds 0.2 mm, the coil spring broke around the stress amplitude of 230 MPa. In contrast, in the coil spring having deep residual stress portions 51 and 52, even when a depth of the corrosion pit is as great as 0.4 mm, the coil spring did not break at the stress amplitude of 420 MPa. The coil spring having deep residual stress portions 51 and 52 broke at a portion other than the portion where the corrosion pit was formed at the stress amplitude of 460 MPa.

It has been found that the advantage described above tends to be the same regardless of the type of steel, and a similar advantage was obtained in SUP 7, for example, including the aforementioned SAE 9254 and ultra-high-strength spring steel. According to the present invention, it becomes possible to enhance the corrosion durability of the end turn portion by using a spring steel which is generally used for a suspension coil spring. For this reason, the present invention also has the advantage of preventing the material cost of the coil spring from being increased.

Figure 10:
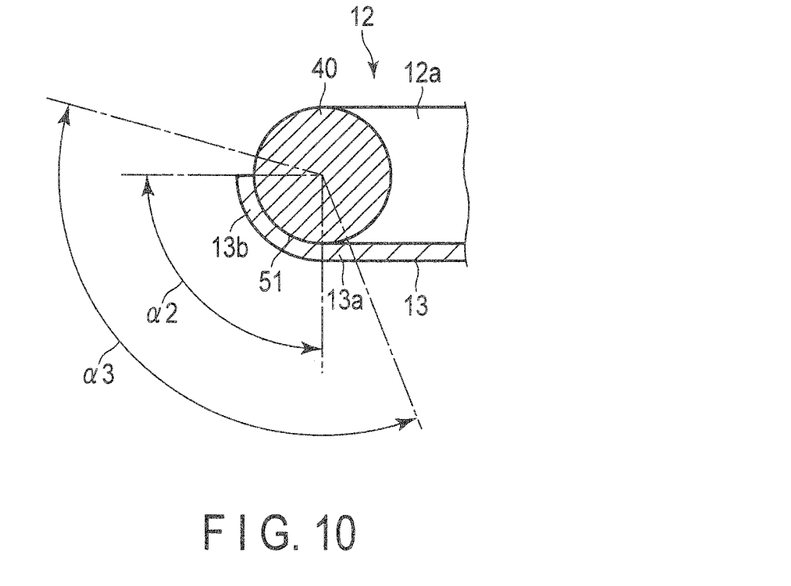
FIG. 10 is a cross-sectional view showing a part of an end turn portion of a coil spring and a spring seat according to a second embodiment.
Figure 11:
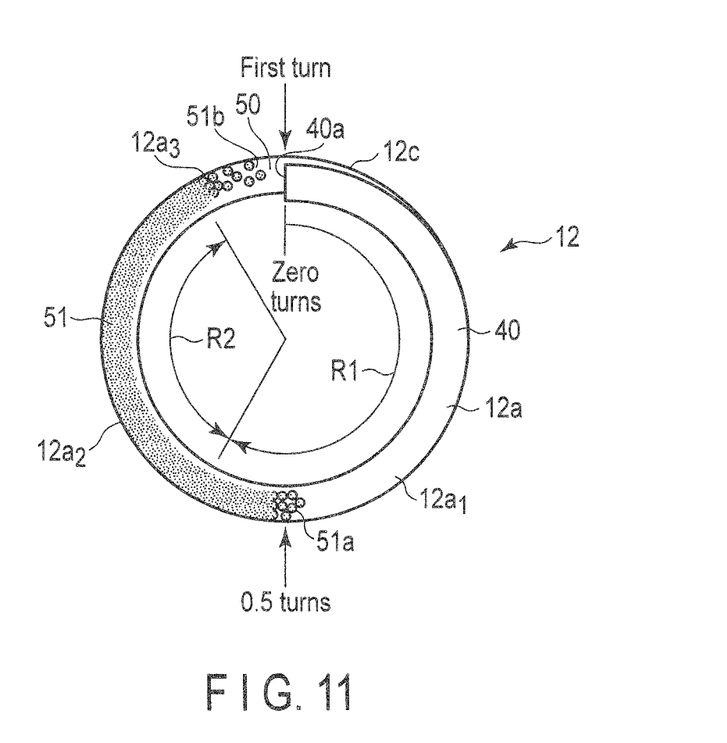
FIG. 11 is a bottom view which schematically illustrates the end turn portion of the coil spring shown in FIG. 10.

FIG. 10 shows a part of an end turn portion 12a of a coil spring 12, and a part of a spring seat 13 according to a second embodiment. FIG. 11 is a bottom view which schematically illustrates end turn portion 12a shown in FIG. 10. A lower surface and an outer peripheral surface of end turn portion 12a of this embodiment are restrained by a bottom surface 13a and an outer sidewall 13b of the spring seat 13, respectively. Accordingly, end turn portion 12a contacts the bottom surface 13a and the outer sidewall 13b of the spring seat 13 in a range shown by α2. Therefore, a deep residual stress portion 51 is formed in range α3 greater than α2. Structures other than that are common to the coil spring 12 of the first embodiment.

Figure 12:
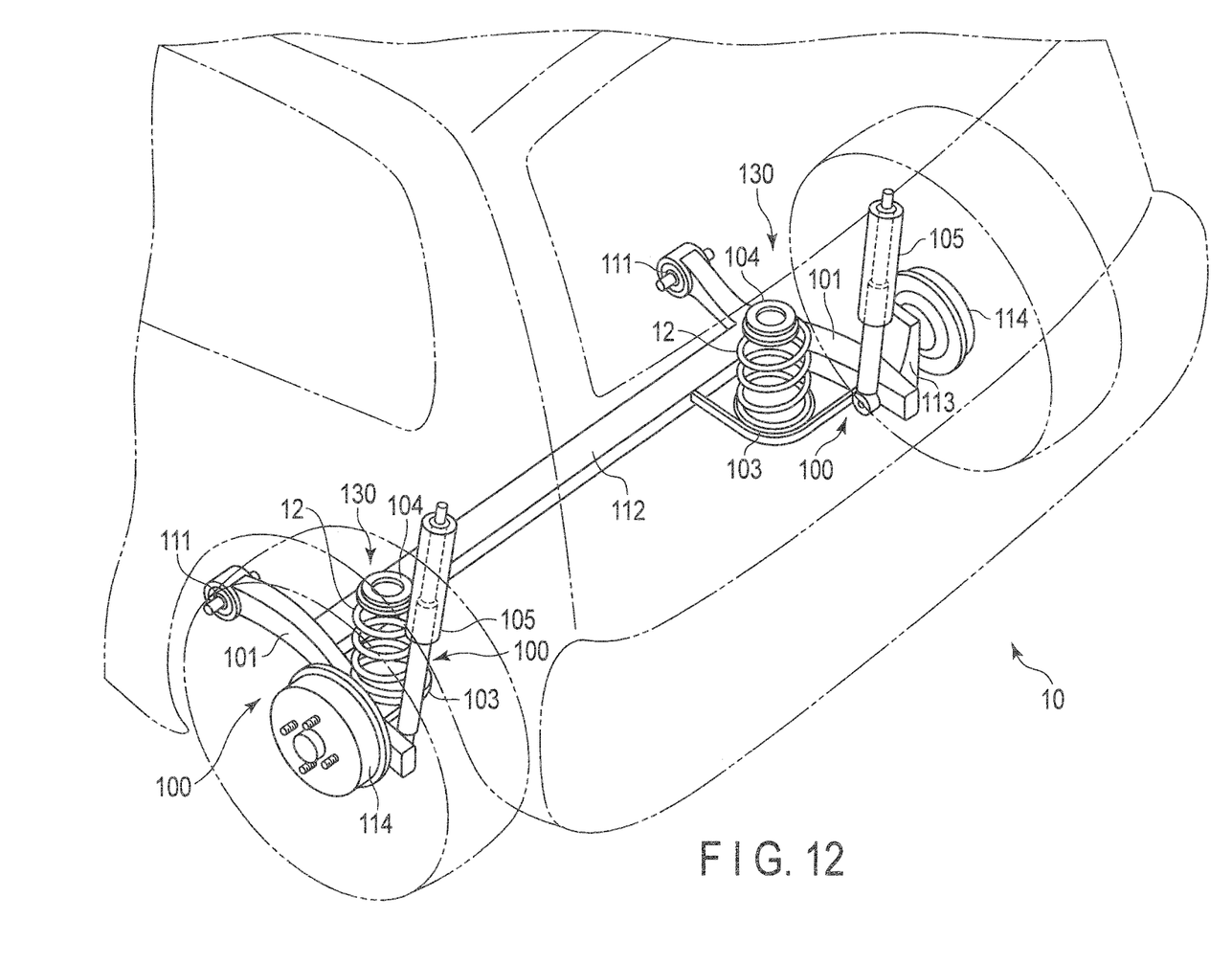
FIG. 12 is a perspective view which schematically shows the rear of a vehicle comprising a suspension spring apparatus according to a third embodiment.

FIGS. 12 to 15 show an example of a coil spring 12 which is used for a knee-action-type suspension mechanism 100 according to a third embodiment. As shown in FIG. 12, a pair of right and left suspension mechanisms 100 is provided on a rear side of a vehicle 10. Since the pair of right and left suspension mechanisms 100 have an equivalent structure, one of the suspension mechanisms 100 will be hereinafter described as a typical example of the suspension mechanisms.

Figure 13:
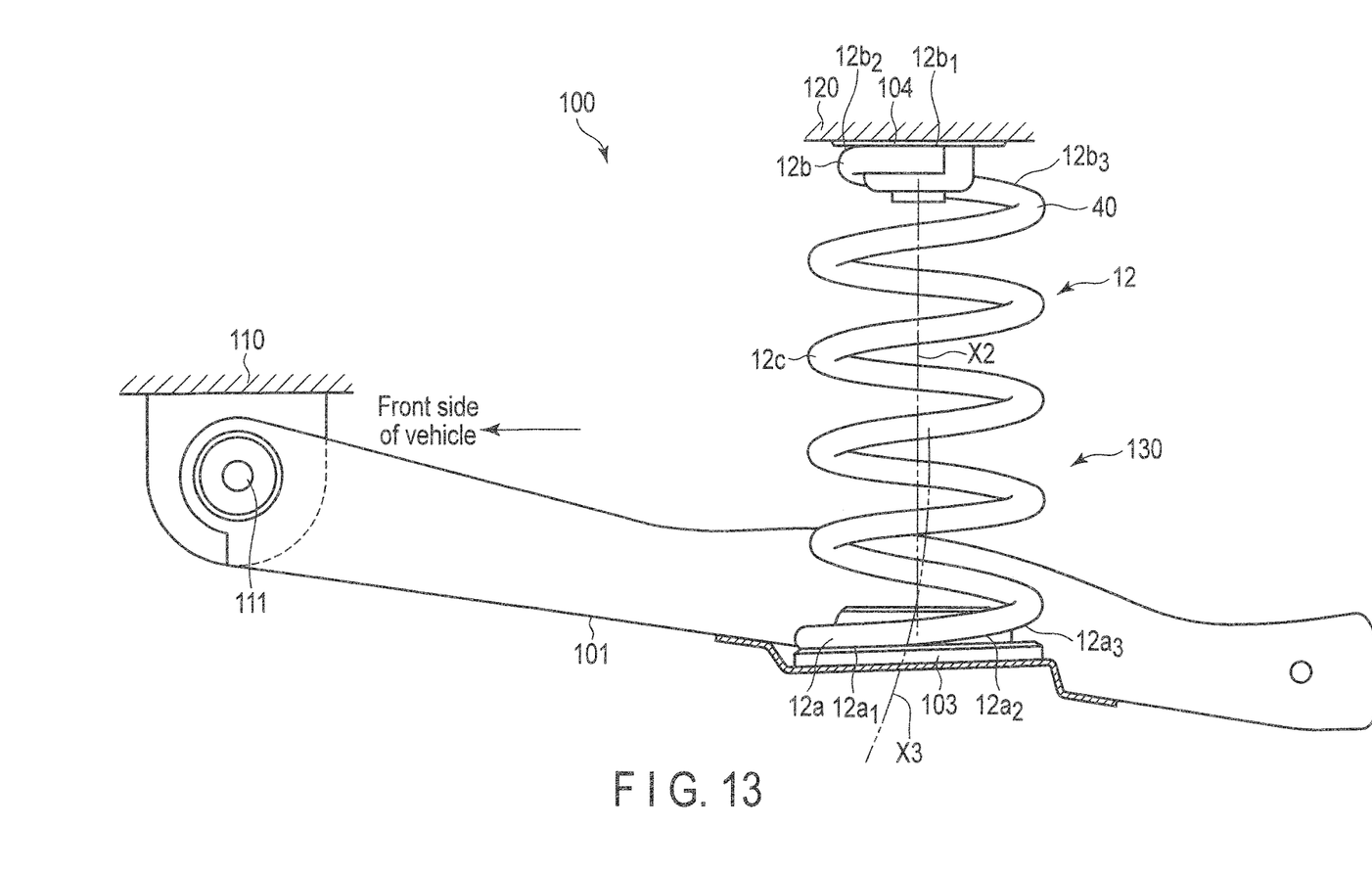
FIG. 13 is a side view of the suspension spring apparatus shown in FIG. 12 as seen from the side of the vehicle.

FIG. 13 is a side view of the suspension mechanism 100 as seen from the side of the vehicle 10. The suspension mechanism 100 comprises an arm member 101 which functions as a trailing arm, a suspension coil spring 12, a lower spring seat 103, an upper spring seat 104, and a shock absorber 105 (FIG. 12). The lower spring seat 103 is disposed on the lower end side of the coil spring 12. The upper spring seat 104 is disposed on the upper end side of the coil spring 12. The arm member 101 is arranged on an arm mounting portion 110 of the vehicle via a pivot (a pivot shaft) 111. The arm member 101 can be moved up and down about the pivot 111. As shown in FIG. 12, a pair of right and left arm members 101 are coupled to each other by a beam member 112. The beam member 112 extends in the width direction of the vehicle 10. The arm member 101 is provided with a hub unit 114 by an axle support portion 113.

As shown in FIG. 13, the lower spring seat 103 is provided on the arm member 101. The lower spring seat 103 swings up and down relatively along the arc-shaped trajectory X3 (FIG. 13) with the pivot 111 being the center. The upper spring seat 104 is provided on a spring mounting portion 120 of the vehicle. The coil spring 12 is compressed between the lower spring seat 103 and the upper spring seat 104, and urges the arm member 101 downward. A suspension coil spring apparatus 130 is constituted by the coil spring 12 and the spring seats 103 and 104.

Figure 14:
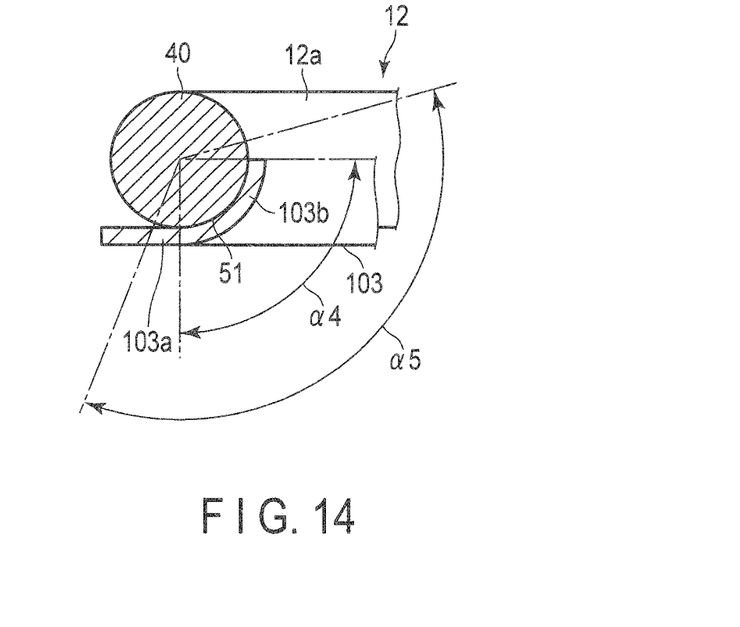
FIG. 14 is a cross-sectional view of a part of the suspension spring apparatus shown in FIG. 13 in an enlarged scale.

FIG. 14 shows a part of an end turn portion 12a, and a part of the spring seat 103. A lower surface and an inner peripheral surface of end turn portion 12a are restrained by a bottom surface 103a and an inner sidewall 103b of the spring seat 103, respectively. Accordingly, the lower surface and the inner peripheral surface of end turn portion 12a contact the bottom surface 103a and the inner sidewall 103b of the spring seat 103, respectively, in a range shown by α4. As shown in FIG. 14, a deep residual stress portion 51 is formed in range α5 greater than α4. Structures other than that are common to the coil spring 12 of the first embodiment (FIGS. 3 to 6).

Figure 15:
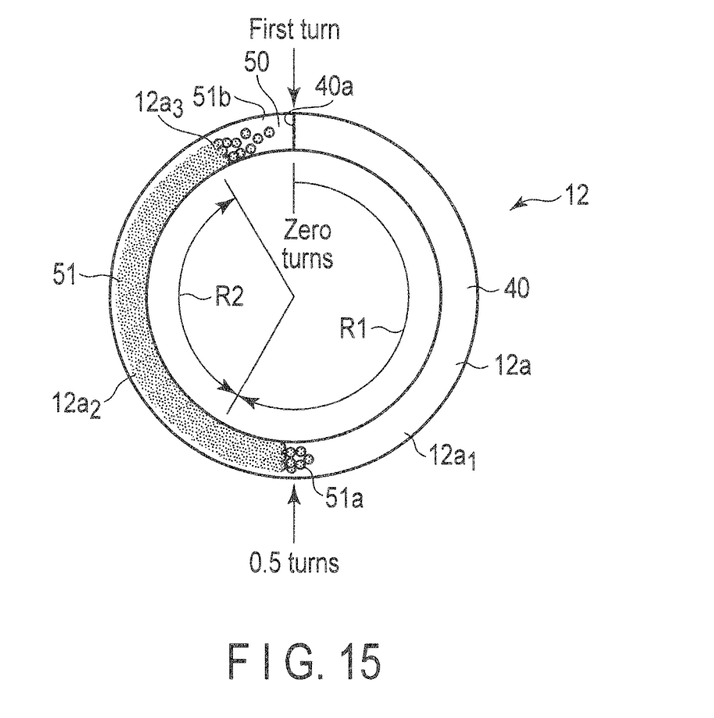
FIG. 15 is a bottom view which schematically shows an end turn portion of a coil spring of the suspension spring apparatus shown in FIG. 13.

FIG. 15 is a bottom view which schematically illustrates end turn portion 12a, and deep residual stress portion 51 is represented in a satin pattern. As in the coil spring 12 (FIGS. 3 to 6) of the first embodiment, deep residual stress portion 51 is formed in a region including at least a second portion 12a$_2$ of end turn portion 12a.

The coil spring 12 provided in the suspension mechanism 100 is extended and retracted between a full-bump (the maximum compression state) and a full-rebound (the maximum expansion state) in accordance with the magnitude of the load. For example, when the coil spring 12 is extended, the second portion 12a$_2$ of the lower end turn portion 12a is separated from the lower spring seat 103. Accordingly, foreign substances such as sand may enter between the second portion 12a$_2$ and the spring seat 103. Conversely, when the coil spring 12 is compressed, the second portion 12a$_2$ contacts the spring seat 103. Consequently, when hard foreign substances such as sand are caught between end turn portion 12a and the spring seat 103, coating of the coil spring 12 may come off or a wire 40 may be damaged, which may be a cause of a corrosion pit to be produced.

In the coil spring 12 (FIG. 15) of the present embodiment, as in the coil spring 12 (FIGS. 3 to 6) of the first embodiment, deep residual stress portion 51 is formed in a region including at least a second portion 12a$_2$. Accordingly, it is possible to prevent the coil spring 12 from being broken due to the corrosion of end turn portion 12a, and durability can be improved. Note that a deep residual stress portion 52 similar to deep residual stress portion 51 on the lower side may also be formed on an upper end turn portion 12b.

Needless to say, in carrying out the present invention, in addition to the specific shape and dimension, the number of turns, the material, and the spring constant of the coil spring, the form, structure, arrangement and the like of each of the elements which constitute the suspension spring apparatus (i.e., the coil spring, spring seat, etc.) may be modified variously. Also, the present invention can be applied to a suspension mechanism of a vehicle other than cars.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a suspension coil spring, the suspension coil spring including a lower end turn portion which is less than one turn from a lower end of a wire formed into a helical shape, and an upper end turn portion which is less than one turn from an upper end of the wire, the method comprising:
   a primary shot peening step comprising forming first shot peening indentations on a surface of the wire by projecting first shots toward the wire and forming a compressive residual stress portion to which a compressive residual stress is imparted from the surface of the wire to a first depth; and
   an ultrasonic shot peening step performed after the primary shot peening step, the ultrasonic shot peening step comprising:
      projecting ball shots as second shots toward the lower end turn portion by an ultrasonic apparatus, wherein a size of each of the ball shots is larger than a size of each of the first shots, and
      forming, by the projection of the ball shots, second shot peening indentations on a surface of the lower end turn portion, and a deep residual stress portion in the lower end turn portion, a compressive residual stress of the deep residual stress portion being imparted from the surface of the wire to a second depth that is deeper than the first depth.

2. The method according to claim 1, wherein a size of each of the second shot peening indentations formed by the ultrasonic shot peening step is larger than a size of each of the first shot peening indentations, and an average surface roughness of the deep residual stress portion is less than an average surface roughness of the compressive residual stress portion.

3. The method according to claim 1, wherein a maximum absolute value of the compressive residual stress of the deep residual stress portion formed by the ultrasonic shot peening step is greater than a maximum absolute value of the compressive residual stress of the compressive residual stress portion.

4. The method according to claim 1, wherein the ultrasonic shot peening step forms the deep residual stress portion at both of the lower end turn portion and the upper end turn portion.

5. The method according to claim 1, further comprising a coating step performed after the ultrasonic shot peening step, the coating step comprising applying a coating to a surface of the coil spring.

* * * * *